Sept. 22, 1925.

H. S. HEICHERT

1,554,848

PROCESS AND APPARATUS FOR DRAWING GLASS

Filed Aug. 9, 1921 6 Sheets-Sheet 5

INVENTOR
Herman S. Heichert
by
James C. Bradley
atty

Sept. 22, 1925.  1,554,848
H. S. HEICHERT
PROCESS AND APPARATUS FOR DRAWING GLASS
Filed Aug. 9, 1921  6 Sheets-Sheet 6

INVENTOR
Herman S. Heichert
by James C. Bradley
Atty.

Patented Sept. 22, 1925.

1,554,848

UNITED STATES PATENT OFFICE.

HERMAN S. HEICHERT, OF PITTSBURGH, PENNSYLVANIA, ASSIGNOR TO PITTSBURGH PLATE GLASS COMPANY, A CORPORATION OF PENNSYLVANIA.

PROCESS AND APPARATUS FOR DRAWING GLASS.

Application filed August 9, 1921. Serial No. 490,867.

*To all whom it may concern:*

Be it known that I, HERMAN S. HEICHERT, a citizen of the United States, and a resident of Pittsburgh, in the county of Allegheny and State of Pennsylvania, have made a new and useful invention in Improvements in Processes and Apparatus for Drawing Glass, of which the following is a specification.

The invention relates to the drawing of glass in sheet form, and has for its principal objects the provision of an improved apparatus and process for continuously drawing, flattening and cutting sheet glass with a minimum amount of marring of the surface of the sheet and a minimum amount of breakage during the flattening and cutting of the continuous band or sheet. One embodiment of the invention is illustrated in the accompanying drawings, wherein:

In its preferred form the apparatus comprises a drawing drum located over a bath of molten glass. This drawing drum is provided on its faces with flattening stones of clay or other suitable refractory material, and in operation the rotation of the drum draws a continuous sheet of glass which is pulled up over the drum, the successive corners of the drum acting as the drawing means for the sheet. The drum is preferably located in a heated chamber so that the sheet reaches the drum at a comparatively high temperature, but not at a temperature such that the face of the sheet which contacts with the flattening stones will be marred by such contact. To facilitate the bending of the glass where it passes around the corners of the drum, heating means are employed which apply heat along the lines of bending for a short time before the corners of the drum engage the sheet and until the bending around such corners is completed. The heating means is preferably in the form of a band or wire which extends transversely of the sheet and is electrically heated. This wire or band is applied to the sheet and suitable mechanism is employed for carrying it along with the sheet during the necessary period of heating. The glass is also preferably severed into sections upon the drum, although this is not necessarily the case, each section being coextensive in length with the length of the side of the drum. This severing may be accomplished in various ways but is preferably done by applying a heating element in the form of a wire or band brought to a suitable temperature by means of an electrical current and applied to the sheet of glass opposite the corner of the drum. This heating element is carried by suitable mechanism so that it engages the sheet of glass at the corner and travels with it a distance such that the element may melt its way through the sheet, thus securing a severing of the glass. After the sheet is severed it is carried around upon the drum to a point opposite a horizontally extending leer, at which point the sheet is automatically transferred from the drum to a suitable carrying device in the leer. The drum as illustrated is provided with eight sides, although this may be varied, and is mounted for a limited back and forth movement above the bath. Means are provided for giving the drum the necessary back and forth movement to maintain the line of draw in a vertical plane, this being necessary, because otherwise the successive corners of the leer which act as drawing elements would bend the sheet back and forth, due to the fact that these corners move in an arc around the center of the drum. In the form of apparatus shown, this back and forth movement is accomplished by means of cam mechanism in connection with a counterweight. It is also necessary that the speed of draw of the sheet in a vertical plane should be maintained constant, which would not be the case if the axis of the drum were merely given a constant speed of angular rotation. Means are therefore provided for driving the drum from points located in line with its corners, so that a constant speed at these points is insured. Specifically, this drive comprises a sprocket chain which passes around a spider whose arms are toothed at their ends, with such arms of a length such that the toothed ends are in substantial alignment with the corners of the drum. The operating mechanism for the drum is practically all located outside of the heating chamber which carries the drum, so as not to be exposed to the relatively high temperature in such chamber, and any metal parts which are necessarily located in the chamber are made of heat resisting compositions such as Monel metal, nichrome or chromel.

Figure 1:
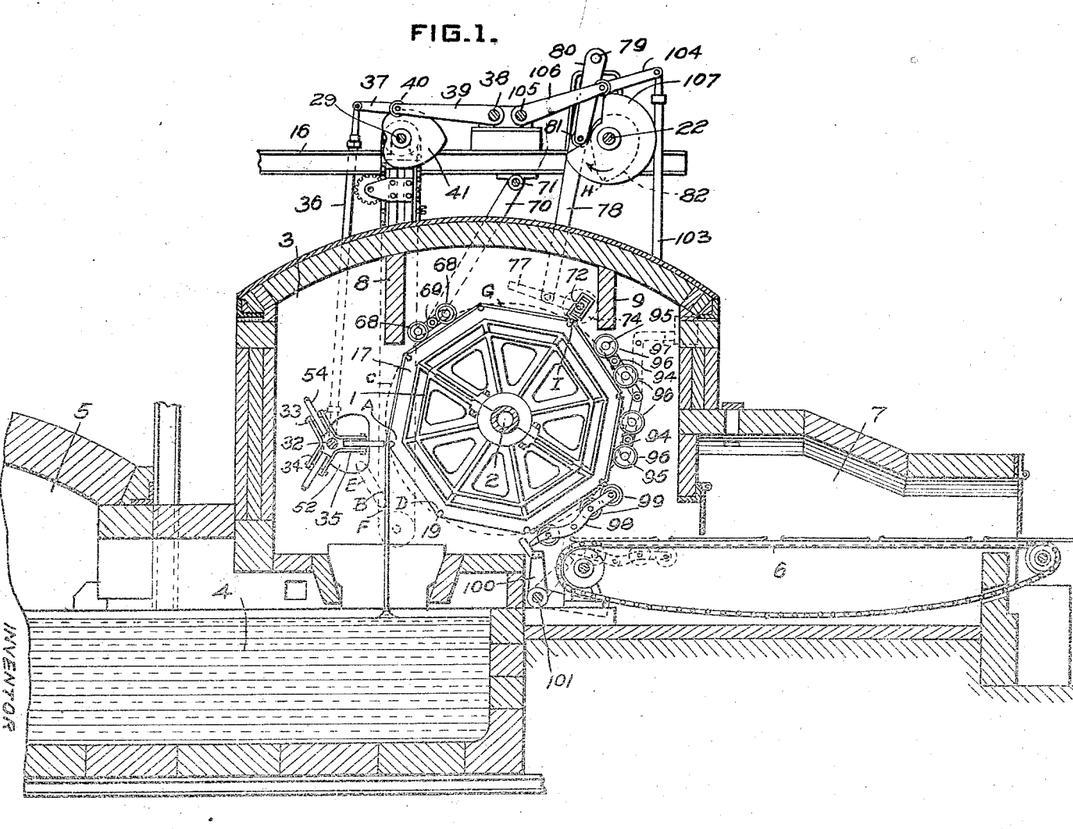
Figure 1 is a vertical section through the preferred type of apparatus.
Figure 2:
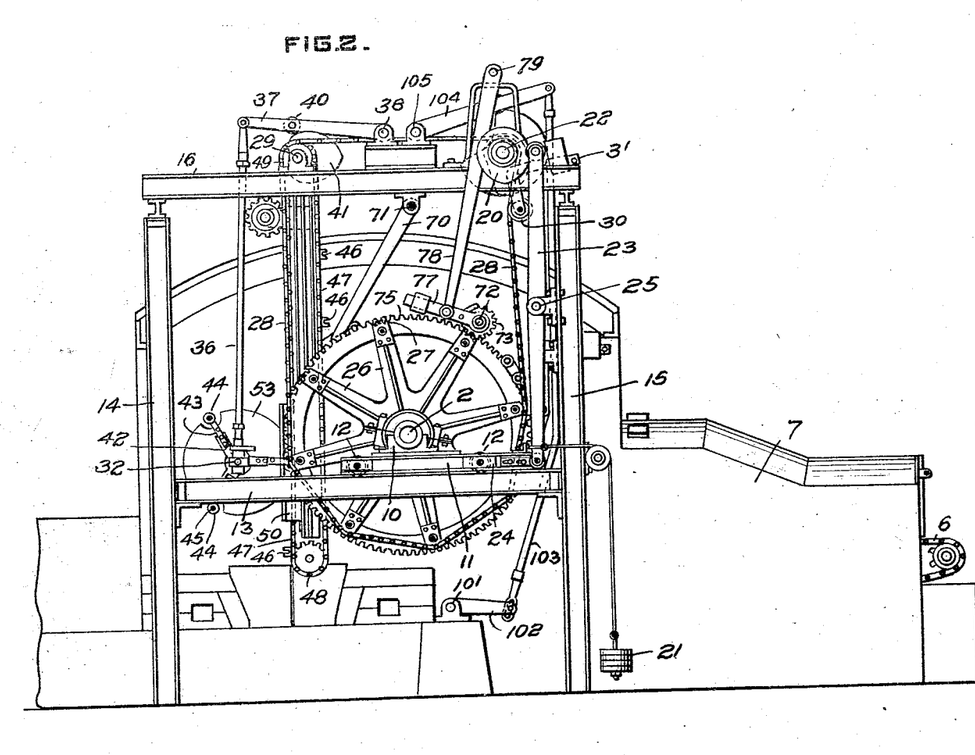
Fig. 2 is a side elevation of the apparatus.
Figure 3:
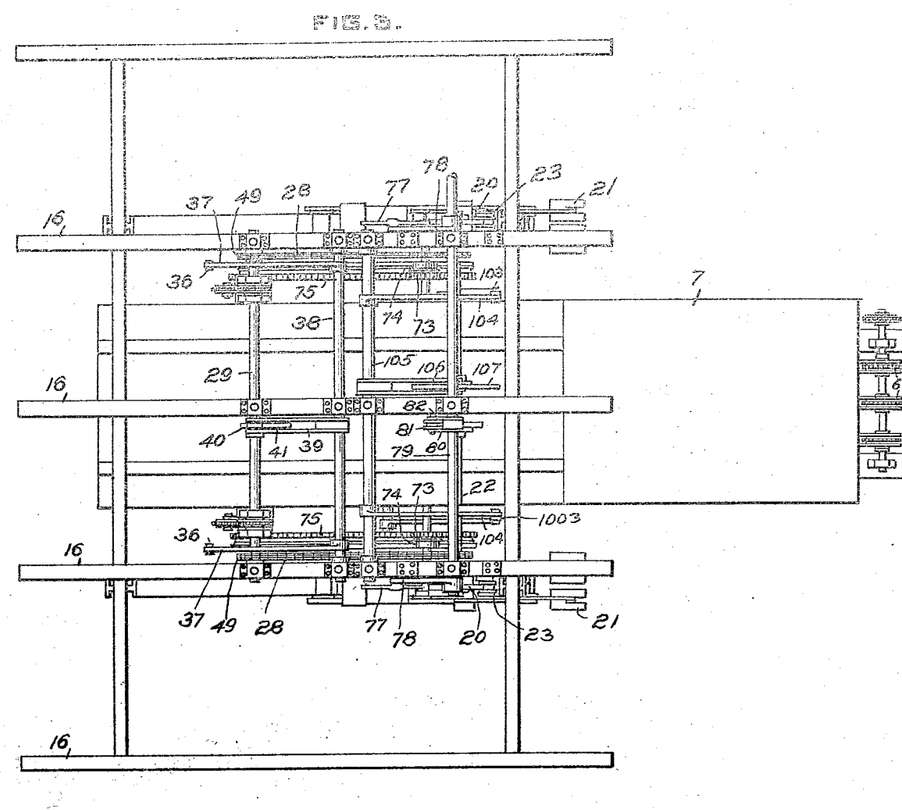
Fig. 3 is a plan view.

Referring now to the drawings, and particularly to Figs. 1, 2 and 3, 1 is the drawing drum supported upon the hollow drive shaft 2. This drum is shown as having eight sides and is located in the chamber 3 above the glass bath 4, such bath constituting the forehearth of the heating furnace 5. The chamber 3 is maintained at a relatively high temperature by means of the heat from the bath, but this degree of heat may be augmented, if required, by means of suitable gas burners placed within the chamber or by the use of any desired supplemental heating means. An endless carrier 6 located at the right hand side of the drum is employed for receiving the sheets from the drum after they have been flattened and severed, and carrying them laterally through the chamber 7, in which they are partially or entirely annealed, depending upon the length of the chamber. The baffle walls 8 and 9, depending from the arch of the chamber, are designed to regulate the distribution of heat in the chamber to a certain extent, and serve to reduce the temperature to the right of these baffles as compared with the temperature to the left thereof, it being desired to maintain the temperature in that portion of the chamber in which the glass is drawn and bent over the drum at a higher temperature than in those portions where the glass is being flattened and severed.

The drive shaft 2 is extended through the wall of the furnace and supported in suitable bearings 10, as indicated in Fig. 2. These bearing are carried upon truck members 11 provided with wheels 12 running upon the I beams or sections 13. These beams comprise the track upon which the drum is moved laterally back and forth, as heretofore referred to, the beams being secured at their ends to the sections 14 and 15, constituting a part of the super-structure of the chamber which surrounds the crown or arch thereof. This super-structure is provided at its upper end with the transverse beams 16, upon which the drive mechanism for operating the drum and controlling the movement of the various parts associated therewith is mounted.

Figures 5, 6, 7:
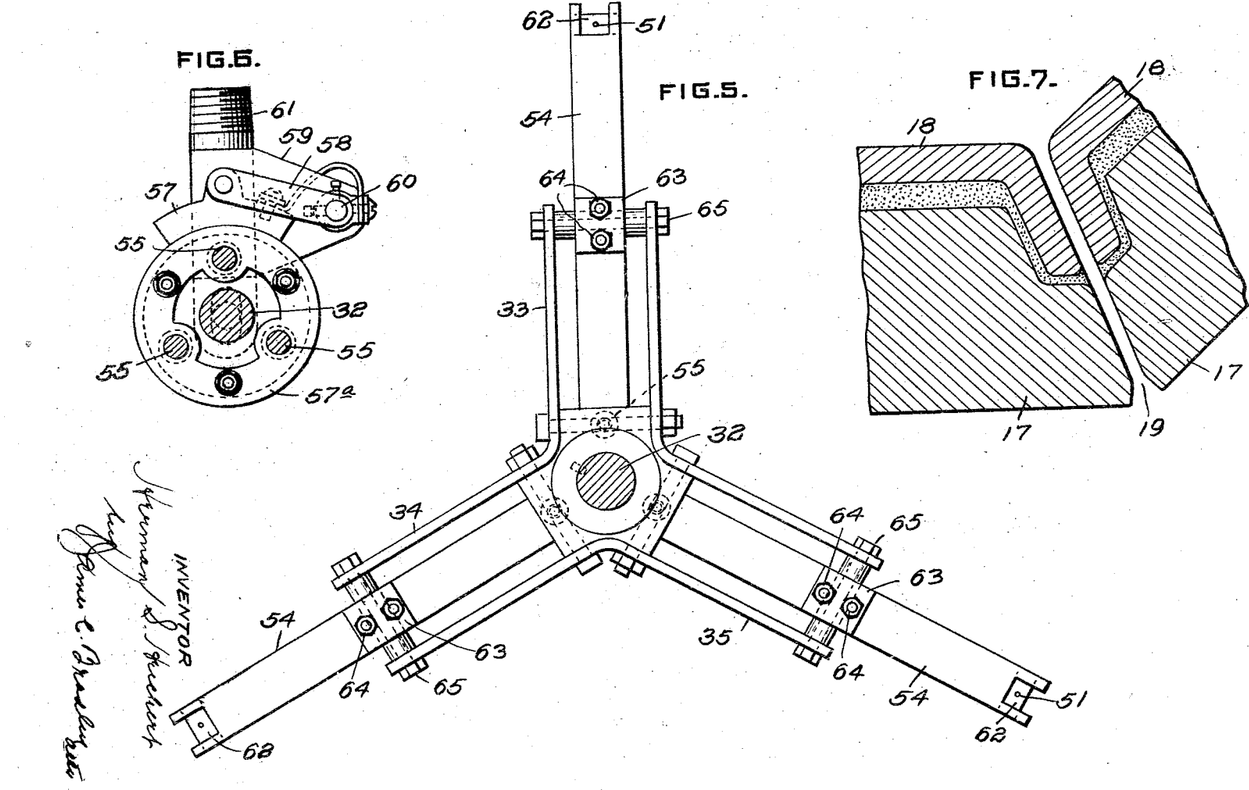
Fig. 7 is an enlarged sectional view taken through one corner of the drawing drum.

The drum comprises a spider-like framework of metal of the general shape shown in Fig. 1, which carries upon its periphery the flattening stones 17 shown in enlarged fragmentary cross section in Fig. 7. These stones are mounted in metal pans or plates 18 secured to the spider framework of the drum and are preferably composed of clay such as that employed in the flattening stones used in the ordinary window glass flattening ovens. These stones are made separate with the spaces 19 at their ends, which ends are located at the corners of the drum. These spaces provide for the entrance of the cutting off element later described, such cutting off element comprising a wire which is pressed upon the glass where it bends around the corner of the drum opposite the slot 19. This wire is electrically heated to the necessary temperature and travels with the drum a distance such that the wire melts its way thru the glass, thus severing the sheet. The side walls of the chamber 3 are suitably slotted to permit of the back and forth movement of the drum upon its trucks or supports 11. The back and forth movement of the drum is accomplished by means of the pair of cams 20 shown in Figs. 2 and 3 in connection with the counterweights 21, the cams severing to move the drum to the left, and the counterweights serving to move the drum in the reverse direction. The cams 20 are mounted upon a shaft 22 driven from a suitable source of power not shown, and engage rollers upon the upper ends of the levers 23 (Fig. 2), the lower ends of such levers being provided with rollers which engage the blocks 24 mounted for longitudinal adjustment upon the trucks 11. The levers 23 are fulcrumed as indicated at 25 in Fig. 2, and the cams 20 are so designed that as the drum rotates the drawing corner thereof is maintained in a vertical plane. That is, from the time the corner of the drum first engages the glass sheet until such corner arrives at the horizontal center line of the drum, the drum is moved to the right to prevent swinging the point of draw to the left, and during the period in which this drawing corner moves from the horizontal center line of the drum to the point at which the next corner of the drum comes in drawing contact with the sheet, the axis of the drum is moved to the left to prevent the sheet from being bent to the right.

In order to drive the drum at a uniform drawing speed, the spiders 26, as shown in Fig. 2, are employed, one spider being secured to each end of the drive shaft adjacent the bearings 10. The end of each spider arm is provided with a gear segment 27 located in line with a corner of the drum. The drive is accomplished by means of the sprocket chain 28 which passes around the gear segments on the spider and up over a pair of sprockets carried by the shafts 29 and 22, mounted upon the beams 16. In order to take up the slack in the chain, which is required because of the back and forth movement of the drum, the idlers 30 (Fig. 2) are employed, such idlers being carried upon the counter-weighted bell crank levers 31. This arrangement insures that the vertical movement of the glass sheet will be uniform as the sprocket chain is driven at a constant speed and the gear segments 27 on the spider arms move in a true vertical plane during the period in which each corner of the drum acts as the drawing element.

Figure 4:
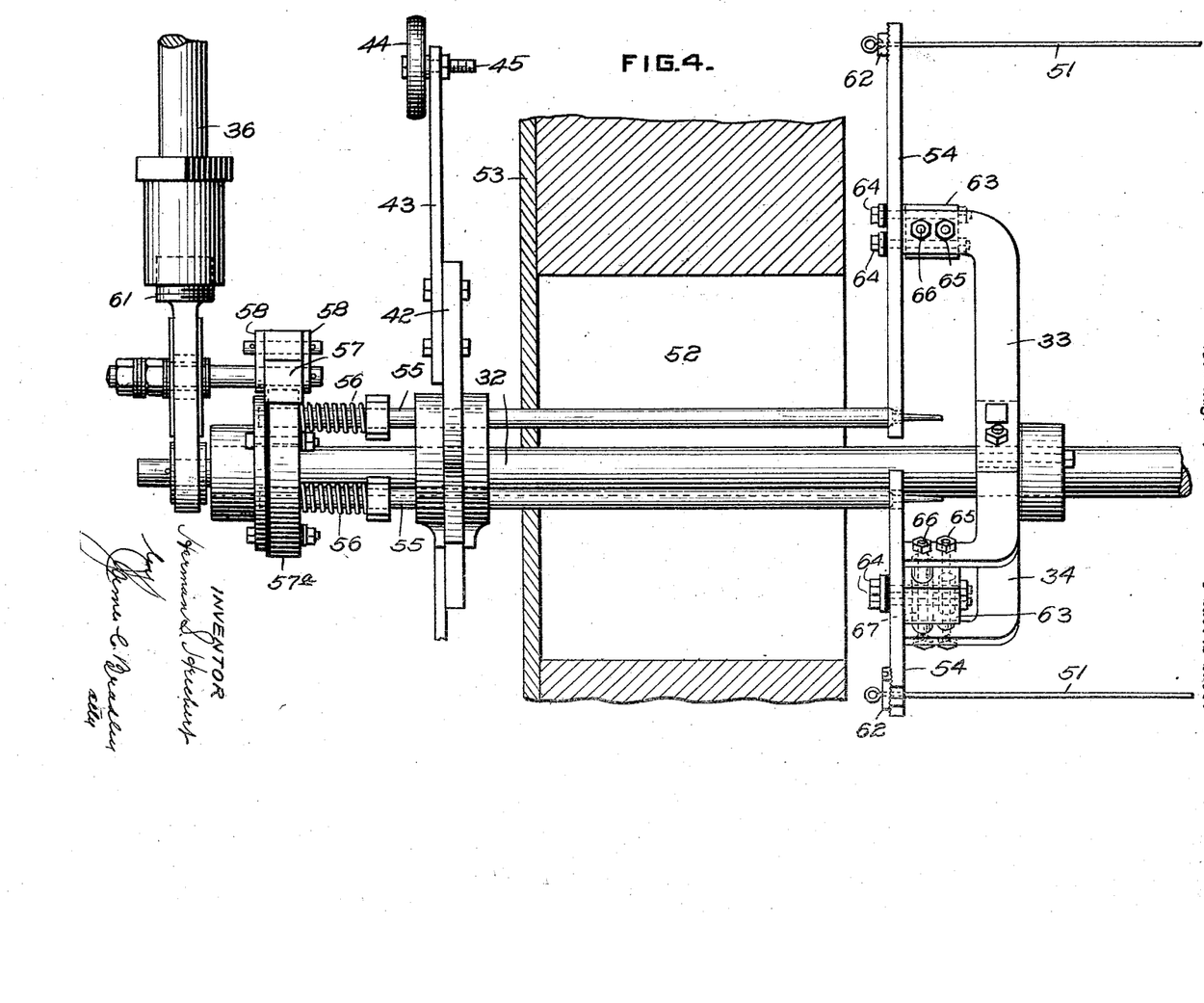
Figs. 4, 5 and 6 are detailed views showing the heating device which is applied to give the glass sheet its proper temperature for bending opposite the corners of the drawing drum.

In order to provide for the heating of the glass sheet along the line upon which it is to be bent, as it approaches the drawing corner of the drum and as it is bent around such corner, the device shown in assembled position in Figs. 1 and 2 and in detail in Figs. 4, 5 and 6, is employed, such device being mounted upon the transverse shaft 32. This device lies partially within the heated chamber, as indicated in Fig. 1, and partially without the chamber, as indicated in Fig. 2, and is provided with three heating wires or bands carried by three pairs of arms 33, 34 and 35. The portion of the device lying outside the heating chamber comprises the means for rotating the device about its axis 32 and for giving it its movement vertically so that the heating wire in contact with the glass may follow the movement of the glass at the corner of the drum.

The means for moving the axle of the heating device vertically comprises the connecting rod 36 shown in Fig. 2 (one at each end of the shaft 32) and the levers 37 operated from the rock shaft 38. This rock shaft is provided intermediate its ends with a lever 39 (Fig. 3), carrying at its free end the roller 40 in engagement with the cam 41, said cam being mounted upon the countershaft 29.

Mounted adjacent each end of the shaft 32 is a spider 42 having three arms 43 carrying rollers 44 at their ends, the purpose of this part of the mechanism being to give the shaft 32 and its heating elements a rotary movement corresponding to the movement of the drum. The rollers 44 are mounted upon the pins 45, which are adapted to engage the sockets 46 carried at intervals by the chain 47 (Fig. 2). This chain is mounted upon sprockets 48 and 49 at its lower and upper ends respectively, the upper sprocket 49 being keyed to the driven countershaft 29. The sprocket 49 has the same pitch diameter as the sprocket on the drive shaft 22 which drives the drum, so that the vertical speed of movement of the sockets 46 and of the drawing corners of the drum are the same. Guide channels 50 are provided opposite the spiders 42, such channels being adapted to receive the rollers 44, so that the ends of the spiders and the heating wires, which are carried by the inner spider arms 33, 34 and 35 (Fig. 1), are moved in true vertical planes. The sockets 46 are adapted to successively engage the pins 45 on the spider arms 43, and move the ends of the arms vertically, the guides 50, which receive the rollers 44, insuring that the ends move in vertical right lines, thus relieving the necessity of backing up or supporting the chain 47 during this period of movement.

The spider arms 33, 34 and 35, (Fig. 1), located inside the heated chamber, are designed to carry the heating wires 51 (Fig. 5) and these heating wires are in alignment with the pins 45 on the outer ends of the spider arms 43 (Fig. 2). The means for rotating the shaft 32 carrying the heating elements and for moving such shaft vertically as above described, provides for the engagement of one of the heating elements with the glass sheet before this portion of the glass is engaged by the drawing corner of the flattening drum. For instance, the corner of the drum marked A in Fig. 1 first engages the glass at the point marked B and moves therewith in a true vertical plane until the point C is reached, at which time the next corner D reaches the point B. The heating device is so arranged that during the travel of the corner A from the point B to the point C, which is the period of bending of the sheet, the heating element shall be in contact with the glass. It is also desirable that the heating element should engage the glass before the point B is reached and before the bending commences, so that the initial position of the spider arms carrying the heating elements is as indicated by the dotted arm position marked E, which brings the heating wire into engagement with the glass at the point marked F. In order to provide clearance for the necessary movement of the shaft 32 of the heating device, the openings 52 in the side walls of the furnace are provided, and such openings may be covered by suitable plates 53, as indicated in Fig. 2, which are carried by the shaft 32 and turn therewith.

In order to provide tension upon the heating wires 51 so that they will be constantly held straight and in contact with the glass sheet throughout its width, the arms 54 are employed, mounted for rocking movement upon the spider arms 33, 34 and 35 (Fig. 5), and the outer ends of these arms are yieldingly held outward by reason of the presser rods 55, held yieldingly inward by the springs 56. Current is supplied to the heating wires from a shoe 57 (Fig. 6), which engages a contact roller 57$^a$ carried by the rods 55, the shaft 32 lying in an open space at the center of this contact roller as indicated in Fig. 6. The current to the wires passes through the rods 55 and out through the arms 54 to the ends of the heating wires, the spider arms 33, 34 and 35 being insulated from the arms 54. The construction at the other end of the wires is similar, the current being taken off at such other end in a similar manner. The shoes 57 (Fig. 6) are carried by links 58 pivoted at their other ends to the supporting brackets 59, as indicated at 60. The supporting brackets have at their upper ends 61 a screw connection with the rods 36 (Fig. 2), which give the shaft 32 of the heating device its up and down movement. In order to provide for the radial adjustment of the heating wires 51, such wires are connected at their ends to the blocks 62 (Fig. 5), which are ribbed on their inner faces to correspond to ribs on the outer ends of the bars 54, so that the blocks can be adjusted in and out and held by the spring tension imparted by the presser bars 55. The pivot blocks 63 for the arms 54 are secured to the bars by means of the bolts 64 and are pivoted upon the transverse bolts 65 carried by the outer spaced ends of the spider arms 33, 34 and 35. The rocking movement of the blocks is limited by other bolts 66 carried by the ends of the spider arms, such bolts working in enlarged openings 67 in the blocks as indicated in the lower portion of Fig. 4. These blocks are preferably of insulating material and insulating material is provided between the inner ends of the blocks and the adjacent sides of the bars 54.

The ends of the rods 55 extend loosely through perforations in the inner ends of the bars 54, so that a rocking movement at this point is permitted.

In order to insure that the glass shall fit smoothly over the stones of the drum from corner to corner, a device is preferably employed for applying pressure to the upper surface of the glass. As indicated in Fig. 1, this device is in the form of a pair of rollers 68 which are provided with axles which extend at each end through the wall of the heating chamber and are connected by bars 69. These bars are held in position by means of bars 70 pivoted at their lower ends to the framework of the apparatus, as indicated at 71. The rollers are of considerable weight and bear upon the surface of the glass with sufficient force to flatten it from one corner of the drum to the other, in case this flattening is necessary.

Figures 8, 9, 10, 11:
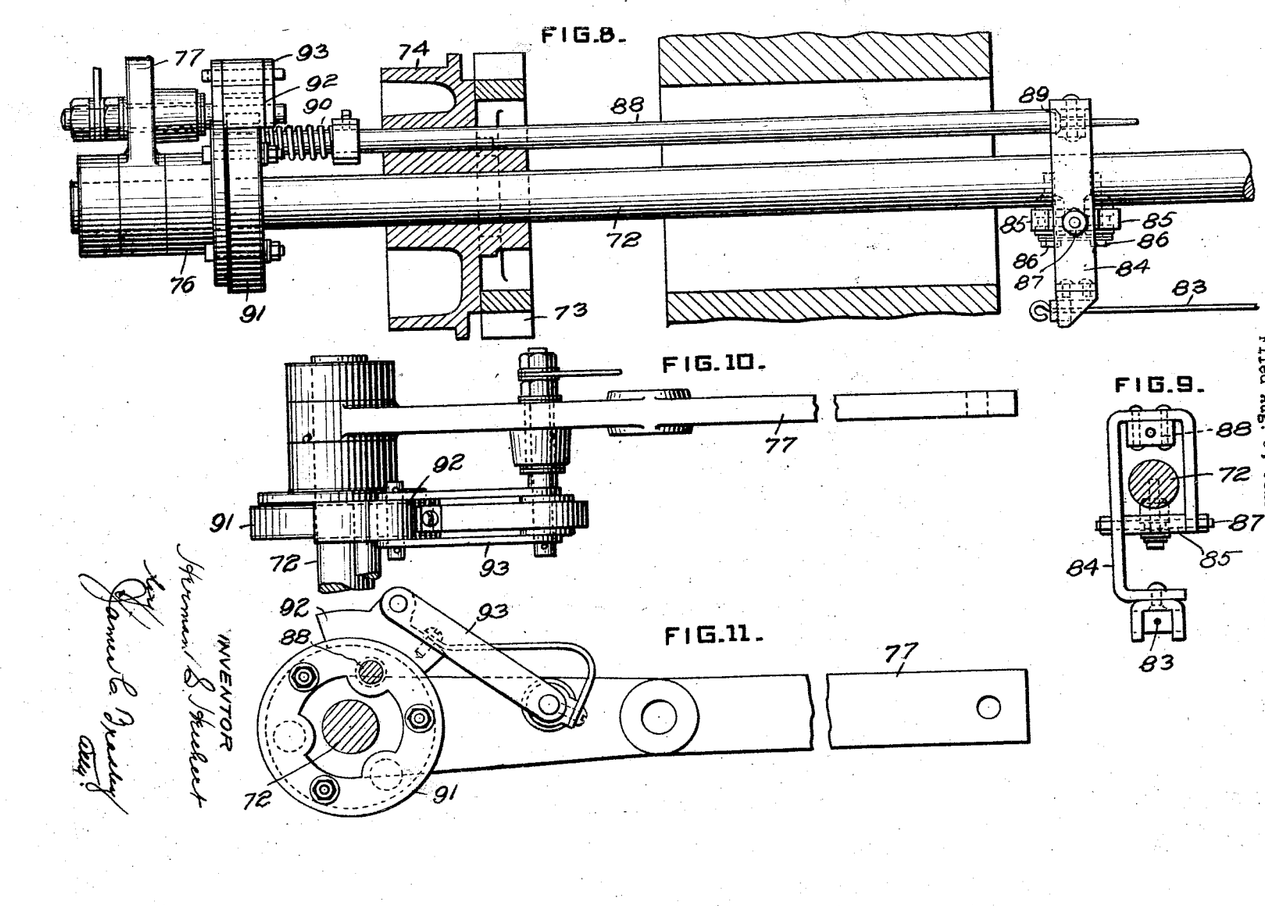
Figs. 8, 9, 10 and 11 are detailed views of the mechanism for heating and cutting off the glass after it has been flattened upon the drum.

The glass is cut into sections upon the drum, after passing the flattening device, by means of the mechanism shown in position above the drum in Figs. 1 and 2, and in detail in Figs. 8, 9, 10 and 11. This device is designed to apply heat to the glass at the corners of the drum in a manner quite similar to that heretofore described in connection with applying heat to the glass for the purpose of bending it, but in the present case the heating wire is kept in contact with the glass for such a period of time and heated to such an extent that it melts its way through the glass, thus severing it, the heating wire passing into the slots 19 at the corners of the flattening stones 17 (Fig. 7), and after this operation the wire is withdrawn from between the severed ends of the glass and brought back to its original starting point. The construction is such that the wire is applied to the glass along the line of severance and moves with the drum several inches, a certain amount of pressure being applied to facilitate the melting through operation. Extending transversely across the drum is a shaft 72 provided at its outer ends and outside of the side walls of the heating chamber with a pair of gears 73 (Figs. 2 and 8) and with a pair of guide rollers 74. The gears engage the teeth of racks 75, which are bolted to the ends of the spider arms 26, as shown in Fig. 2. These racks are also provided on their outer sides with tracks upon which the rollers 74 engage. Each end of the shaft is journaled at its end in the hub 76 of a counterweighted lever 77 (Figs. 2 and 10). The lever in each case is supported by a bar 78 keyed at its upper end to a shaft 79. This shaft extends transversely of the machine, as indicated in Fig. 3, and is rocked by means of a lever arm 80 (Fig. 1) provided at its lower end with a roller 81. This roller is in engagement with a cam 82 secured upon the main drive shaft 22.

The heating and cutting off wire for this device is shown at 83 in Fig. 8, such wire being maintained under tension by means of the lever members 84 pivoted upon the blocks 85, which in turn are secured to the shaft 72 by means of the stud bolts 86. The lever arms 84 are of the form indicated in Fig. 9 and are pivoted upon bolts 87 extending transversely through the blocks 85. The end of the lever 84 carrying the cutting off wire is pressed to the left by means of the presser rod 88, whose right hand end has a free rocking connection with the lever 84, as indicated at 89, and is pressed to the right by means of the spring 90. Current is supplied through the presser bar 88 from the contact roller 91, which is secured to the lever or bar 77, as indicated in Fig. 11, and has its periphery in engagement with the shoe 92 carried by the rocking arm 93, the construction being similar to that heretofore described in connection with the heating element of Figs. 4, 5 and 6. The construction at the other end of the shaft 72 is the same as that above illustrated and described and the current which passes through the bar 88 then passes through the lever 84 and through the heating wire to the other end of the device. The shaft 72 is out of contact with the rollers 91, as indicated in Fig. 11, and the block 85 is of insulating material, so that the current passes the path above described.

The cam 82 and the lever connections which support the cutting off wire are so designed that after the cutting off wire engages the glass at the corner of the drum, it moves ahead therewith at the same rate of speed until the device reaches the point indicated in Fig. 1, at which time the cam 82 causes the lower ends of the levers 78 to move to the left, thus running the shaft 72 which carries the cutting off wire, backward, such reverse movement being due to the engagement of the spur gears 73 on the shaft 72 with the racks 75 secured to the ends of spider arms 26. By the time the spur gears on the shaft 72 have been given a complete revolution, so as to bring the heating wire against the glass again, such wire has reached the position marked G in Fig. 1 and the cam 82 has reached a position so that the point H (Fig. 1) is in engagement with the roller 81. From this time on the weight of the parts carried on the cam 82 causes the lower ends of the lever arms to move to the right with the roller 81 in engagement with the cam, so that the heating off wire from the point G on to the point marked I, moves along at the same rate of speed as the drum and without any rotation upon its axle 72, and by the time the point I is reached the wire has melted its way through the glass and is ready to return to its starting point at G.

The sheets as thus severed must be maintained upon the surface of the drum in order to carry them to the taking off point, which, in this case, is the endless conveyor 6. Various means may be employed for holding the severed sheets against the flattening stones, but the device preferably used is that illustrated in Fig. 1 and comprising the pairs of bars 94 between which are mounted axles 95 carrying rollers 96. The rollers are held against the surface of the glass by means of the counterweighted lever 97, whose ends are pivoted to the bars 94 intermediate their ends. By this means the glass is held in position against the surface of the drum until it arrives opposite the endless carrying away mechanism 6 shown in Fig. 1.

A transfer means is provided at this point comprising a pair of arms 98 placed side by side and bearing the rollers 99. These arms are carried at the upper end of a pair of levers 100 keyed at their lower ends to the rock shaft 101. This rock shaft is operated at suitable intervals from the arms 102 secured at their outer ends to the connecting rods 103 (Fig. 2). The upper ends of these connecting rods are connected to rocker arms 104 keyed to a rock shaft 105 (Fig. 1). This rock shaft carries a rocker arm 106, which is operated from the cam 107 mounted upon the drive shaft of the apparatus. When the glass arrives at the position indicated in Fig. 1, the cam operated arm 98 moves downward, depositing the sheet of glass upon the conveyor 6. The movement of the conveyor carries the glass ahead so that the frame 98 can return to its holding position, which position it occupies during the major portion of the revolution of the cam 107 and during the period in which a new sheet of glass is brought to the position indicated in Fig. 1, at which time the operation is repeated. The conveyor is constructed in parallel flights so as to permit the members 98 and their rollers to pass down to the dotted position shown in Fig. 1. The chamber 7 may be constructed so as to act as a leer, but preferably the glass is conducted from this chamber to a leer placed opposite the ends of the chamber 7, the step of annealing being an independent operation which may be carried out in a variety of ways and with different types of apparatus.

Briefly stated the operation of the machine is as follows: The glass in the bath being of a temperature such as to permit drawing, a bait supported from one of the corners of the drum is dipped into the glass and the rotation of the drum started, thus drawing the glass upward and over the drum, the rotation of the drum being accomplished from the drive shaft 22 by means of the sprocket chain 28, which passes around the ends of the spider arms and around the sprockets mounted upon the framework of the machine. This gives the drum a constant vertical drawing speed and the position of the drawing corner of the drum is maintained in a true vertical plane, due to the lateral movement of the drum by means of the cams 20 acting through the lever arms 23, as indicated in Fig. 2. By this means the axis of the drum is moved slightly to the right until the drawing corner of the drum reaches the plane of the horizontal axis thereof, after which the drum is moved to the left until the drawing corner has completed its movement and the next corner of the drum comes into contact with the sheet and from this point on constitutes the drawing point. During the movement of the glass sheet upward and preliminary to its engagement with the corner of the drum, the heating element 51, carried by the spider on the shaft 32, engages the glass and softens it along the line at which the bending is to occur, so that by the time this portion of the glass reaches the corner, it may be readily bent. The heating contact of the wire continues until the bending is completed, after which the rotation of the shaft 32 carries the heating element away from the glass and brings the next heating element in contact with the glass opposite the succeeding corner of the drum, after which the operation is repeated. The glass sheet is pulled tightly over the drum as it turns in a clockwise direction, and any unevenness due to warping or a failure of the sheet to bend with sufficient sharpness opposite the corners of the drum is taken care of by the flattening rollers 68, which bear upon the sheet passing therebeneath. After the sheet has thus flattened, it passes upon the third section of the drum and reaches the point G, at which time the cutting off element mounted upon the shaft 72, whose movements are controlled by the cam 82, engages the sheet at the corner end opposite the slot between the flattening stones and presses upon the glass at this point until it reaches the point I, at which time it melts its way through the glass. The movement of the lever 78 to the left by the cam 82 moves the lever arms 77 to the left, carries the wire away from the glass and retracts it to the left, so that it is again ready to engage the next sheet when the corner of the drum arrives at the point G. The sheets as thus cut off are maintained against the drum during its rotation by means of the rollers 96, and pass beneath the transfer device comprising the frames 98 and the rollers 99, such transfer device then causing the transfer of the glass to the carrier 6, thus completing the cycle of the operation.

What I claim is:

1. In combination in a glass drawing apparatus, a receptacle for a glass bath, a drawing drum located over the bath and provided intermediate its corners with flattening elements adapted to engage and flatten the sections of the glass drawn over the drum, means for rotating the drum to give a constant speed of draw, and means whereby the line of draw is maintained constantly in the same vertical plane.

2. In combination in a glass drawing apparatus, a receptacle for a glass bath, a drawing drum located over the bath and provided intermediate its corners with flattening plates and a flattening device for pressing the glass against such plates.

3. In combination in a glass drawing apparatus, a receptacle for a glass bath, a drawing drum located over the bath and provided intermediate its corners with flattening plates, and a heating element arranged to engage the glass sheet at said corners successively to facilitate bending.

4. In combination in a glass drawing apparatus, a receptacle for a glass bath, a drawing drum located over the bath and provided intermediate its corners with flattening plates, and a heating element for engaging the glass sheet which is drawn along the line at which the glass is bent preliminary to its engagement with the corners of the drum, and for continuing such engagement as the bending progresses.

5. In combination in a glass drawing apparatus, a receptacle for a glass bath, a drawing drum located over the bath and provided intermediate its corners with flattening plates, and means for severing the glass into sheets at said corners of the drum.

6. In combination in a glass drawing apparatus, a receptacle for a glass bath, a drawing drum located over the bath and provided intermediate its corners with flattening plates, means for reheating the glass at said corners, and severing it at such points preliminary to its removal from the drum.

7. In combination in a glass drawing apparatus, a receptacle for a glass bath, a drawing drum located over the bath and provided intermediate its corners with flattening plates, means for severing the glass into separate sheets at the corners of the drum, and means for holding the sheets in place upon the drum after such severing during its further rotation.

8. In combination in a glass drawing apparatus, a receptacle for a glass bath, a drawing drum located over the bath and provided intermediate its corners with flattening plates, means for severing the glass into separate sheets at the corners of the drum, means for holding the sheets in place upon the drum during its further rotation, a lateral carrier leading from a position adjacent the drum, and means whereby the sheets are delivered from the drum to the carrier.

9. In combination in a glass drawing apparatus, a receptacle for a glass bath, a drawing drum located over the bath and provided intermediate its corners with flattening plates, means for severing the glass into separate sheets at the corners of the drum, a lateral carrier leading from a position adjacent the drum, and means whereby the sheets are delivered from the drum to the carrier.

10. The process of drawing glass which consists in drawing a sheet upwardly continuously from a molten bath into a heated chamber and over a rotating flat sided member, heating the sheet along the lines where it is bent over the corners of the member, and applying pressure to the outer face of the glass on the member to flatten such glass against the sides thereof.

11. The process of drawing glass which consists in drawing a sheet upwardly continuously from a molten bath into a heated chamber and over a rotating flat sided member, maintaining the glass at such a temperature as it passes over the member that it may be flattened against the sides of such member without being marred, applying pressure to the outer face of the glass on the member to flatten such glass against the sides thereof, and cutting the glass into sections along lines adjacent the corners of said member.

12. The process of drawing glass which consists in drawing a sheet upwardly continuously from a molten bath into a heated chamber and over a rotating member located in the chamber and having arranged around its periphery a series of flattening stones, applying pressure to the outer face of the glass to flatten such glass against the stones, and severing the glass while still on the member along lines adjacent the corners of the member.

13. The process of drawing glass which consists in drawing a sheet upwardly over a rotating drum having as its faces a series of flattening stones, flattening the glass as it engages said stones, and cutting the glass into sections while still on the stones, the lines of severance being adjacent the corners of the drum.

14. The process of drawing glass, which consists in drawing a sheet upwardly over a rotating drum having as its faces a series of flattening stones, applying additional heat to the glass opposite the corners of the drum to facilitate bending at these points, and cutting the glass into sections while still on the stones, the lines of severance being adjacent the corners of the drum.

In testimony whereof, I have hereunto subscribed my name this 8th day of Aug., 1921.

HERMAN S. HEICHERT.